(12) United States Patent
Nakane et al.

(10) Patent No.: US 6,270,927 B1
(45) Date of Patent: Aug. 7, 2001

(54) LITHIUM SECONDARY BATTERY AND CATHODE ACTIVE MATERIAL FOR USE IN LITHIUM SECONDARY BATTERY

(75) Inventors: Kenji Nakane; Yasunori Nishida, both of Ibaraki; Takeshi Miyai, Osaka; Tomoari Satoh, Ibaraki, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/019,726

(22) Filed: Feb. 6, 1998

(51) Int. Cl.[7] .............................. H01M 4/58; C01D 15/02
(52) U.S. Cl. ................... 429/231.95; 429/231.1; 429/223; 423/594; 423/641
(58) Field of Search ................. 429/223, 231.1, 429/231.95; 423/594, 641

(56) References Cited

U.S. PATENT DOCUMENTS

| | | | |
|---|---|---|---|
| 4,668,595 | * 5/1987 | Yoshino et al. | 429/194 |
| 5,591,548 | * 1/1997 | Mao | 429/218 |
| 5,595,842 | * 1/1997 | Nakane et al. | 429/223 |
| 5,750,288 | * 5/1998 | Xie et al. | 429/229 |

* cited by examiner

Primary Examiner—Carol Chaney
Assistant Examiner—Angela J. Martin
(74) Attorney, Agent, or Firm—Sughrue, Mion, Zinn, Macpeak & Seas, PLLC

(57) ABSTRACT

Provided is a lithium secondary battery of a high energy density using a cathode active material having an excellent cycle characteristic in charging/discharging at a high capacity and a small irreversible capacity. The lithium secondary battery comprising: a cathode including a material that can be doped/undoped with lithium ions as an active material; an anode including a lithium metal, a lithium alloy, or a material that can be doped/undoped with lithium ions as an active material; and a liquid or solid electrolyte, wherein lithiated nickel dioxide containing tin is used as the cathode active material, and said lithiated nickel dioxide has a peak near $2\theta=34.4°$ and does not have a peak near $2\theta=22.5°$ in the X-ray diffraction pattern by CuK$\alpha$ rays, or the intensity ratio of the peak near $2\theta=22.5°$ to the peak near $2\theta=34.4°$ is 1.2 or less.

7 Claims, 2 Drawing Sheets

LITHIUM SECONDARY BATTERY AND CATHODE ACTIVE MATERIAL FOR USE IN LITHIUM SECONDARY BATTERY

BACKGROUND OF THE INVENTION

1. Technical Field of the Invention

The present invention relates to a lithium secondary battery comprising a cathode including a material that can be doped/undoped with lithium ions as an active material; an anode including a lithium metal, a lithium alloy, or a material that can be doped/undoped with lithium ions as an active material; and a liquid or solid electrolyte, and to the cathode active material for use in the lithium secondary battery.

2. Related Art of the Invention

With a rapid advance of portable and cordless electronic devices, demands for a lithium secondary battery which can realize small size, lightweight and a large capacity compared to the conventional secondary batteries have been increasing.

As a cathode active material in a lithium secondary battery, lithiated cobalt dioxide has been studied and it has already been put into practical use in the lithium secondary batteries as a power source for cellular phones and camcorders. Recently, lithiated nickel dioxide using a nickel compound as a raw material which is cheaper than cobalt compound and abundant in terms of resources has been examined actively.

Lithiated nickel dioxide, as well as lithiated cobalt dioxide, is a compound having an $\alpha$-$NaFeO_2$ structure. However, it is difficult to synthesize lithiated nickel dioxide compared to lithiated cobalt dioxide, because nickel is easily substituted at a lithium site in lithiated nickel dioxide. Recent progress in the synthetic conditions has offered substantial practicability of stoichiometric composition of lithiated nickel dioxide presenting a high discharge capacity. However, the lithiated nickel dioxide still suffers capacity drop-off associated with repeated cycles of charging/discharging processes at high capacity, or in other words, a poor cycle characteristic.

SUMMARY OF THE INVENTION

An object of the present invention is to provide a lithium secondary battery of a high energy density using a cathode active material having an excellent cycle characteristic in charging/discharging at a high capacity and a small irreversible capacity.

DETAILED DESCRIPTION OF THE INVENTION

Figure 1:
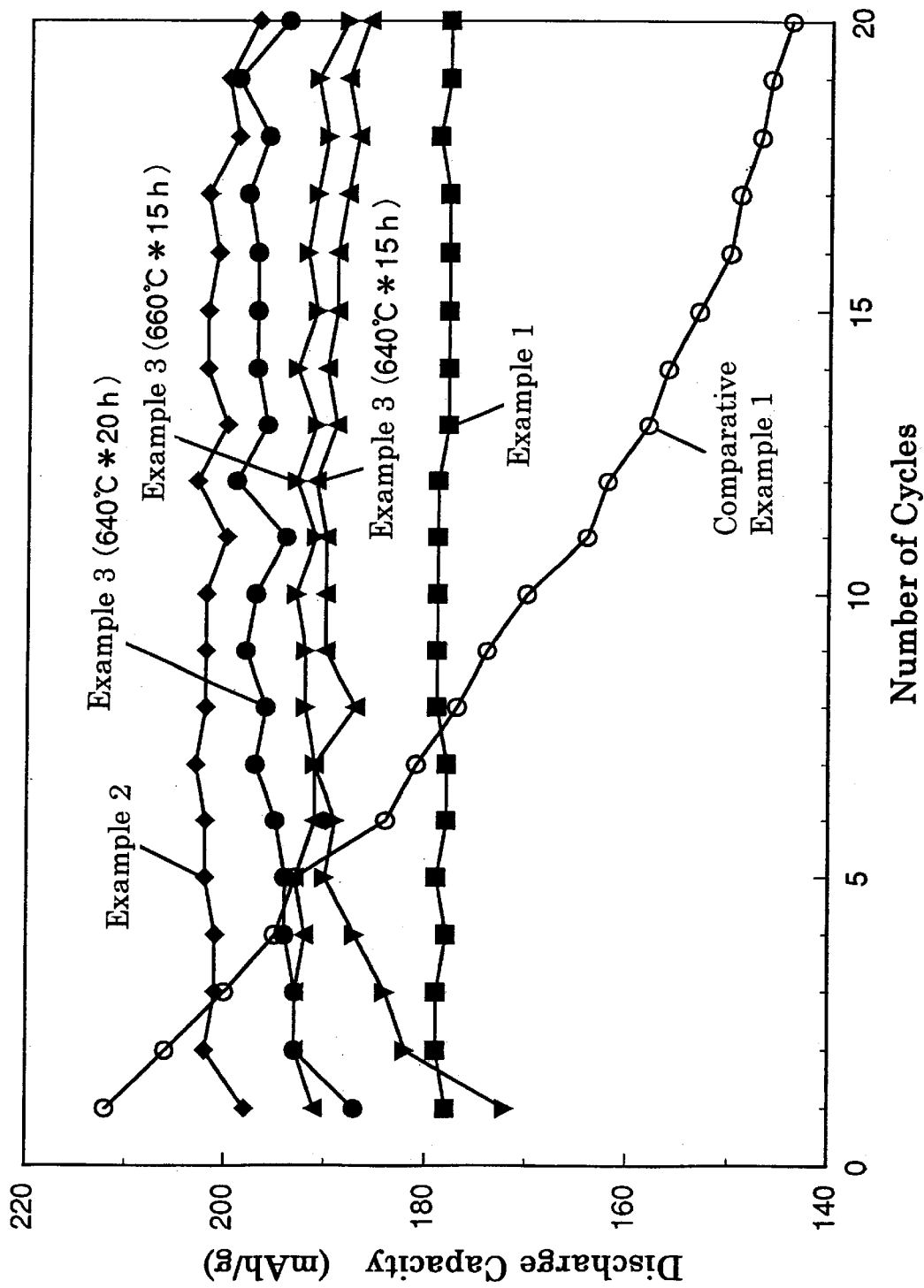
FIG. 1 is a graph showing the variation with cycles of the discharge capacity in Examples 1–3 and Comparative Example 1.

After intensive studies, the present inventors found that a lithium secondary battery having an excellent cycle characteristic in charging/discharging at a high capacity and a high energy density, can be obtained by using, as a cathode active material, a lithium secondary battery comprising: a cathode including a material that can be doped/undoped with lithium ions as an active material; an anode including a lithium metal, a lithium alloy, or a material that can be doped/undoped with lithium ions as an active material; and a liquid or solid electrolyte, wherein lithiated nickel dioxide containing tin is used as the cathode active material, and said lithiated nickel dioxide has specific intensity ratio in the X-ray diffraction pattern by CuK$\alpha$ rays.

That is, the present invention is:

[1] A lithium secondary battery comprising:
a cathode including a material that can be doped/undoped with lithium ions as an active material;
an anode including a lithium metal, a lithium alloy, or a material that can be doped/undoped with lithium ions as an active material; and a liquid or solid electrolyte, wherein lithiated nickel dioxide containing tin is used as the cathode active material, and said lithiated nickel dioxide has a peak near $2\theta=34.4°$ and does not have a peak near $2\theta=22.5°$ in the X-ray diffraction pattern by CuK$\alpha$ rays, or the intensity ratio of the peak near $2\theta=22.5°$ to the peak near $2\theta=34.4°$ is 1.2 or less.

[2] A lithium secondary battery according to [1], wherein the lithiated nickel dioxide containing tin is obtained by firing a mixture of a lithium compound, a nickel compound and tin or a tin compound.

[3] A lithium secondary battery according to [2], wherein lithium stannate is used as a tin compound.

[4] A lithium secondary battery according to [2], wherein the lithiated nickel dioxide containing tin is obtained by the steps of dispersing a tin compound and a nickel compound in an aqueous solution including a water-soluble lithium salt, evaporating a water content of the resultant solution to obtain a mixture, and firing the resultant mixture in an atmosphere containing oxygen.

[5] A lithium secondary battery according to [4], wherein lithium nitrate is used as the water-soluble lithium salt, and a basic nickel carbonate is used as the nickel compound.

[6] A lithium secondary battery according to [2], wherein the firing is conducted at a temperature of lower than 660° C.

[7] A cathode active material for use in a lithium secondary battery, wherein said cathode active material is lithiated nickel dioxide containing tin, which has a peak near $2\theta=34.4°$ and does not have a peak near $2\theta=22.5°$ in the X-ray diffraction pattern by CuK$\alpha$ rays, or the intensity ratio of the peak near $2\theta=22.5°$ to the peak near $2\theta=34.4°$ is 1.2 or less.

Next, the present invention will be explained in detail. In the lithium secondary battery of the present invention, the cathode includes a material that can be doped/undoped with lithium ions as an active material. And as the material that can be doped/undoped with lithium ions, lithiated nickel dioxide containing tin is used, in which said lithiated nickel dioxide has a peak near $2\theta=34.4°$ and does not have a peak near $2\theta=22.5°$ in the X-ray diffraction pattern by CuK$\alpha$ rays, or the intensity ratio of the peak near $2\theta=22.5°$ to the peak near $2\theta=34.4°$ is 1.2 or less.

Here, the peak near $2\theta=34.4°$ is assigned to the diffraction line (200) of lithium stannate ($Li_2SnO_3$:JCPDS card No.31-0763). When this peak is not observed, improvement of the cycle characteristic in the charging/discharging at a high capacity is insufficient, and it is not preferable.

Although the peak near $2\theta=22.5°$ is unassigned, when the relative intensity of this peak to the peak near $2\theta=344.4°$ becomes large, it is not preferable because the irreversible capacity (difference of charged quantity of electricity and discharged quantity of electricity observed in early stages) at the time of charging/discharging increases, even though the cycle characteristic is improved.

Specifically, when the intensity ratio of the peak near $2\theta=22.5°$ to the peak near $2\theta=34.4°$ is 1.2 or less, the irreversible capacity can be lowered below 50 mAh/g on the basis of the weight of cathode active material with maintaining a good cycle characteristic, it is preferable.

As a process for obtaining the above-mentioned lithiated nickel dioxide containing tin, the process comprising the steps of mixing tin or a tin compound with previously synthesized lithiated nickel dioxide and firing the mixture can be used. However, a process comprising the steps of mixing a lithium compound, a nickel compound and tin or a tin compound and firing the mixture is preferable because the production process can be simplified and a small amount of tin can be added uniformly.

Moreover, it can also be used the process comprising the steps of mixing first a nickel compound and tin or a tin compound and firing the mixture, and then further mixing a lithium compound and firing the resultant mixture again. Similarly, it can also be used the process comprising the steps of mixing first a lithium compound and tin or a tin compound and firing the mixture, and then further mixing a nickel compound and firing the resultant mixture again.

Examples of the lithium compound used in the present invention include lithium carbonate, lithium nitrate, lithium hydroxide, etc.

Examples of the nickel compound used in the present invention include nickel oxide, nickel hydroxide, nickel nitrate, nickel carbonate $NiCO_3.wH_2O$ (in the formula, $w>=0$), basic nickel carbonate $xNiCO_3.yNi(OH)_2.zH_2O$ (in the formula, $x>0$, $y>0$ and $z>0$), acidic nickel carbonate $Ni_mH_{2n}(CO_3)_{m+n}$ (in the formula, $m>0$ and $n>0$) etc.

As a raw material of tin to be added, tin compounds such as metallic tin or oxide and its hydrate, and nitrate can be used. The valence of tin in a tin compound can be either divalent or tetravalent, and mixtures thereof can be also used. By using lithium stannate ($Li_2SnO_3$) as a tin compound previously synthesized by reacting with a lithium compound, a material having an especially excellent cycle characteristic can be obtained, and it is preferable.

As a process for mixing and firing a lithium compound, a nickel compound and a tin compound, it is preferred that the process comprising the steps of dispersing a tin compound and a nickel compound in an aqueous solution including a water-soluble lithium salt, evaporating a water content of the resultant solution to obtain a mixture, and firing the resultant mixture in an atmosphere containing oxygen.

According to the above process, the water-soluble lithium salt can be mixed with the tin compound and the nickel compound uniformly, and a partial deficiency of lithium in lithiated nickel dioxide containing tin generated by the inhomogeneity of mixed composition can be prevented.

The present inventors found a preferable combination of raw materials, namely, lithium nitrate is used as a water-soluble lithium salt and a basic nickel carbonate is used as a nickel compound, respectively. The lithium secondary battery using a resultant lithiated nickel dioxide containing tin obtained by this method shows a high energy density.

The firing process preferably proceeds in an atmosphere containing oxygen, more preferably in an atmosphere of oxygen, and particularly preferably in a stream of oxygen.

The firing temperature is preferably from 350° C. to 800° C., and more preferably from 600° C. to 750° C. When the firing temperature is not lower than 600° C. and lower than 660° C., the irreversible capacity can be lowered below 40 mAh/g on the basis of the weight of cathode active material with maintaining a good cycle characteristic, it is preferable. When the firing temperature is higher than 800° C., the rate of the rock salt type domain in which lithium ions and nickel ions are arranged irregularly in lithiated nickel dioxide becomes large, and reversible charging/discharging is disturbed, it is not preferable. When the firing temperature is lower than 350° C., the generation reaction of lithiated nickel dioxide hardly proceeds, and it is not preferable.

The firing time is preferably 2 hours or more, and more preferably 5 hours or more. Moreover, 40 hours or less is practically preferable.

After firing, obtained lithiated nickel dioxide can be treated or milled in an atmosphere including carbon dioxide, preferably in an atmosphere which carbon dioxide content is higher than air. According to the above process, the sheet-type cathode with large density can be produced.

The cathode of the lithium secondary battery of the invention includes the active material of the aforementioned lithiated nickel dioxide containing tin, and can further include other components such as a carbonaceous material as a conductive substance and a thermoplastic resin as a binder.

Examples of the carbonaceous material include natural graphite, artificial graphite, cokes, carbon black and the like. Such conductive substances may be used alone or in combination as a composite conductive substance, such as of artificial graphite and carbon black.

Examples of the thermoplastic resin include poly (vinylidene fluoride) (which may hereinafter be referred to as "PVDF"), polytetrafluoroethylene (which may hereinafter be referred to as "PTFE"), tetrafluoroethylene-hexafluoropropylene-vinylidene fluoride copolymer, hexafluoropropylene-vinylidene fluoride copolymer, tetrafluoroethylene-perfluorovinyl ether copolymer and the like. The above resins may be used alone or in combination of two or more.

The anode of the lithium secondary battery of the invention includes a lithium metal, a lithium alloy or a material that can be doped/undoped with lithium ions. Examples of the material that can be doped/undoped with lithium ions include carbonaceous materials such as natural graphite, artificial graphite, cokes, carbon black, pyrolytic carbons, carbon fibers, fired products of organic polymer compounds and the like; and a chalcogen compound of oxide, sulfide and the like, which compound can be doped/undoped with lithium ions at lower potentials than in the cathode. A carbonaceous material including a graphite material such as natural graphite and artificial graphite as a main component is preferred, because the combination of such a carbonaceous material and a cathode provides a high energy density due to the flatness of their charging/discharging potential and low average working potential.

As to a combination of the anode with a liquid electrolyte, in case where the liquid electrolyte does not contain ethylene carbonate, an anode containing poly(ethylene carbonate) is preferably used to improve the cycle characteristic and the large-current discharging characteristic of the battery.

The carbonaceous material can be in any shape including a flaky shape like natural graphite, a spherical shape like mesocarbon micro-beads, a fibrous shape like graphitized carbon fiber and an agglomerate of fine powders. If required, a thermoplastic resin as a binder can be added to the carbonaceous material. Examples of a usable thermoplastic resin include PVDF, polyethylene, polypropylene and the like.

Examples of the chalcogen compound of an oxide, sulfide and such, used as the anode, include crystalline or amorphous oxides essentially comprised of a group XIII element, a group XIV element and a group XV element of the periodic law, such as amorphous compounds essentially comprised of tin compounds. Similarly to the above, there can be added, as required, a carbonaceous material as the conductive substance, or a thermoplastic resin as the binder.

The electrolyte of the lithium secondary battery of the present invention is a liquid or solid electrolyte. As an electrolyte of a liquid, the non-aqueous electrolyte which dissove a lithium salt in an organic solvent is exemplified, and as a solid electrolyte, so-called a solid electrolyte is exemplified.

As lithium salts dissolved in a non-aqueous electrolyte, $LiClO_4$, $LiPF_6$, $LiAsF_6$, $LiSbF_6$, $LiBF_4$, $LiCF_3SO_3$, $LiC(CF_3SO_2)_3$, $LiN(CF_3SO_2)_2$, $Li_2B_{10}Cl_{10}$, lower aliphatic lithium carboxylate and $LiAlCl_4$ are mentioned, and can be used alone or in combination of two or more.

Examples of the organic solvent include: carbonates such as propylene carbonate, ethylene carbonate, dimethyl carbonate, diethyl carbonate, ethyl methyl carbonate, 4-trifluoromethyl-1,3-dioxolane-2-one, 1,2-di(methoxycarbonyloxy)ethane and the like; ethers such as 1,2-dimethoxyethane, 1,3-dimethoxypropane, pentafluoropropyl methyl ether, 2,2,3,3-tetrafluoropropyl difluoromethyl ether, tetrahydrofuran, 2-methyl tetrahydrofuran and the like; esters such as methyl formate, methyl acetate, γ-butyrolactone and the like; nitrites such as acetonitrile, butyronitrile and the like; amides such as N,N-dimethylformamide, N,N-dimethylacetoamide and the like; carbamates such as 3-methyl-2-oxazolidone and the like; sulfur-containing compounds such as sulfolane, dimethylsulfoxide, 1,3-propane sultone and the like. Normally, two or more compounds of the above are used in combination. Above all, a mixed solvent containing a carbonate is preferred and more preferred is a mixed solvent of a cyclic carbonate and a non-cyclic carbonate or of a cyclic carbonate and an ether.

As the mixed solvent of a cyclic carbonate and a non-cyclic carbonate, preferred is a mixed solvent containing ethylene carbonate, dimethyl carbonate and ethyl methyl carbonate, because such a mixed solvent provides a wide operating temperature range, an excellent drain capability and hardly decomposes even when the graphite material such as natural graphite and artificial graphite is used as an anode active material.

Examples of a solid electrolyte include polymer electrolytes such as polyethylene oxide polymer compounds and polymer compounds containing at least one of a polyorganosiloxane branch or polyoxyalkylene branch; sulfide electrolytes such as of $Li_2S$—$SiS_2$, $Li_2S$—$GeS_2$, $Li_2S$—$P_2S_5$, $Li_2S$—$B_2S_3$ and the like; and inorganic compound electrolytes comprising sulfides such as $Li_2S$—$SiS_2$—$Li_3PO_4$, $Li_2S$—$SiS_2$—$Li_2SO_4$ and the like. Additionally, also included is a so-called gel-type electrolyte in which a nonaqueous liquid electrolyte is maintained by a polymer.

The lithium secondary battery according to the invention is not particularly limited in shape and may have any one of the shapes such as a paper-sheet shape, a coin-like shape, a cylindrical shape and a rectangular parallelepiped shape.

In accordance with the invention, there can be obtained a lithium secondary battery of a good cycle characteristic even in the charging/discharging at a high capacity.

Since the irreversible capacity can be lowered by making the intensity ratio of the peak near $2\theta=22.5°$ to the peak near $2\theta=34.4°$ in the X-ray diffraction pattern by CuKα rays below 1.2, the active material can be filled advantageously into a limited volume of a battery, and a high energy density can be attained.

The reason why a battery having excellent characteristics is obtained is not clear, it is presumed that the added tin is incorporated into the crystal structure of lithiated nickel dioxide in a certain form, and further, excess tin exists together as lithium stannate ($Li_2SnO_3$), and the structure of lithiated nickel dioxide is stabilized at the time of charging/discharging, especially at the time of deep charging.

EXAMPLES

The following examples are presented to illustrate the present invention, but should not be construed as limiting the scope of this invention. Unless otherwise particularly described, electrodes for a charging/discharging test and plate batteries were prepared in the following manners.

To a mixture of lithiated nickel dioxide or lithiated nickel dioxide containing tin, as the active material, and acetylene black, as the conductive substance, there was added a solution of PVDF, as the binder, dissolved in 1-methyl-2-pyrrolidone (which may hereinafter be referred to as "NMP") in a ratio of active material:conductive substance:binder=91:6:3 (weight ratio). The resultant mixture was kneaded to obtain a paste. The paste was coated over a #200 stainless steel mesh, which was to work as a current collector, and the mesh bearing the paste was dried under vacuum at a temperature of 150° C. for 8 hours. Thus, an electrode was obtained.

The resultant electrode, an electrolyte comprising a mixed solution of ethylene carbonate (which may hereinafter be referred to as "EC"), dimethyl carbonate (which may hereinafter be referred to as "DMC") and ethyl methyl carbonate (which may hereinafter be referred to as "EMC") in a ratio of 30:35:35, in which mixed solution $LiPF_6$ was dissolved in a concentration of 1 mol/l (which may hereinafter be represented by $LiPF_6$/EC+DMC+EMC), a polypropylene microporous membrane as the separator, and a lithium metal as the counter electrode (i.e., an anode) were assembled together to form the plate battery.

In addition, for X-ray powder diffraction measurement of a sample, RU200 system (manufactured by Rigaku Corporation) was used in the following conditions.

X-ray: CuKα
Voltage-Current: 40kV-30mA
Range of measured angle: $2\theta=15$ to $90°$
Slit: DS-1°, RS-0.3mm, SS-1°
Step: 0.02°
Counting time: 1 second For calculation of the peak intensity ratio, the line strength after removing the background was used.

Example 1

Lithium nitrate (manufactured by Wako Pure Chemical Industries, Ltd., guaranteed graded reagent) 1.45 g, basic nickel carbonate [$NiCO_3.2Ni(OH)_2.4H_2O$: manufactured by Wako Pure Chemical Industries, Ltd., graded reagent] 2.38 g and stannic oxide ($SnO_2$: manufactured by Nihon Kagaku Sangyo Co., Ltd., SH-S, purity 99%) 0.15 g were dry-mixed using agate mortar, and the resultant mixture was charged in a tubular furnace having an alumina core tube and fired in a stream of oxygen (50 $cm^3$/min) at 640° C. for 30 hours. At this point, the molar ratio x of tin to the sum of tin and nickel was set to be 0.05.

X-ray diffraction measurement of resultant powder was conducted, and besides the strong peaks assigned to lithiated nickel dioxide, peaks near $2\theta=22.5°$ and $34.4°$ were observed. The intensity ratio of the peak near $2\theta=22.5°$ to the peak near $2\theta=34.4°$ was 0.1.

By using thus obtained powder, a plate battery (electrolyte: $LiPF_6$/EC+DMC+EMC) was manufactured and subjected to a charging/discharging test using charge by a constant current and voltage, and discharge by a constant current under the following conditions.
Max. charging voltage: 4.3 V, Charging time: 8 hours, Charging current: 0.3 mA/cm$^2$
Min. discharging voltage: 3.0 V,
Discharging current: 0.3 mA/cm$^2$ FIG. 1 is a graphical representation of the variations of the discharge capacity in 20 cycles of charging/discharging processes. Moreover irreversible capacity and retention rate of capacity R (=discharging capacity at 20th cycle/discharging capacity at 10th cycle) are shown in Table 1.

Comparative Example 1

Lithium nitrate (manufactured by Wako Pure Chemical Industries, Ltd., guaranteed graded reagent) 94.1 g was dissolved in 150 g of water, and then basic nickel carbonate [$NiCO_3.2Ni(OH)_2.4H_2O$: manufactured by Wako Pure Chemical Industries, Ltd., graded reagent] 163.0 g was added and homogeneously dispersed therein. After evaporating the water content, the resultant mixture was charged in a tubular furnace having an alumina core tube and fired in a stream of oxygen (50 cm$^3$/min) at 720° C. for 5 hours.

X-ray diffraction measurement of resultant powder was conducted, and the peaks assigned to lithiated nickel dioxide was observed but peaks near $2\theta=22.5°$ and 34.4° were not observed.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions in Example 1.

FIG. 1 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Example 2

First, Lithium nitrate (manufactured by Wako Pure Chemical Industries, Ltd., guaranteed graded reagent) 12.07 g was dissolved in 16.7 g of water, and then metastannic acid ($H_2SnO_3$: manufactured by Nihon Kagaku Sangyo Co., Ltd., purity 95%) 0.28 g and basic nickel carbonate [$NiCO_3.2Ni(OH)_2.4H_2O$: manufactured by Wako Pure Chemical Industries, Ltd., graded reagent] 22.06 g were added and homogeneously dispersed therein. After evaporating the water content, the resultant mixture was charged in a tubular furnace having an alumina core tube and fired in a stream of oxygen (50 cm$^3$/min) at 640° C. for 20 hours. At this point, the molar ratio x of tin to the sum of tin and nickel was set to be 0.01.

X-ray diffraction measurement of the resultant powder was conducted, and besides the strong peaks assigned to lithiated nickel dioxide, peaks near $2\theta=22.5°$ and 34.4° were observed. The intensity ratio of the peak near $2\theta=22.5°$ to the peak near $2\theta=34.4°$ was 0.8.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions with Example 1.

FIG. 1 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Example 3

First, Lithium nitrate (manufactured by Wako Pure Chemical Industries, Ltd., guaranteed graded reagent) 12.07 g was dissolved in 16.7 g of water, and then metastannic acid ($H_2SnO_3$: manufactured by Nihon Kagaku Sangyo Co., Ltd., purity 95%) 0.56 g and basic nickel carbonate [$NiCO_3.2Ni(OH)_2.4H_2O$: manufactured by Wako Pure Chemical Industries, Ltd., graded reagent] 21.84 g were added and homogeneously dispersed therein, and the water content of resultant solution was evaporated. At this point, the molar ratio x of tin to the sum of tin and nickel was set to be 0.02. The resultant mixture were devided into three portions, charged in a tubular furnace having an alumina core tube and fired at 640° C. for 15 hours, at 640° C. for 20 hours, and at 660° C. for 15 hours, respectively.

X-ray diffraction measurement of three resultant powders were conducted, and besides the strong peaks assigned to lithiated nickel dioxide, peaks near $2\theta=22.5°$ and 34.4° were observed in all three powders. The intensity ratios of the peak near $2\theta=22.5°$ to the peak near $2\theta=34.4°$ were 0.2 (firing at 640° C. for 15 hours), 0.5 (firing at 640° C. for 20 hours), and 0.8 (firing at 660° C. for 15 hours).

By using thus obtained powders, plate batteries (electrolyte: $LiPF_6$/EC+DMC+EMC) were manufactured and subjected to the charging/discharging test using charge by a constant current and voltage, and discharge by a constant current under the same conditions with Example 1.

FIG. 1 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Comparative Example 2

The mixture of lithium nitrate, metastannic acid and basic nickel carbonate obtained in Example 3, was charged in a tubular furnace having an alumina core tube and fired in a stream of oxygen (50 cm$^3$/min) at 720° C. for 5 hours.

X-ray diffraction measurement of the resultant powder was conducted, and besides the strong peaks assigned to lithiated nickel dioxide, peaks near $2\theta=22.5°$ and 34.4° were observed. The intensity ratio of the peak near $2\theta=22.5°$ to the peak near $2\theta=34.4°$ was 1.3.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions with Example 1.

Figure 2:
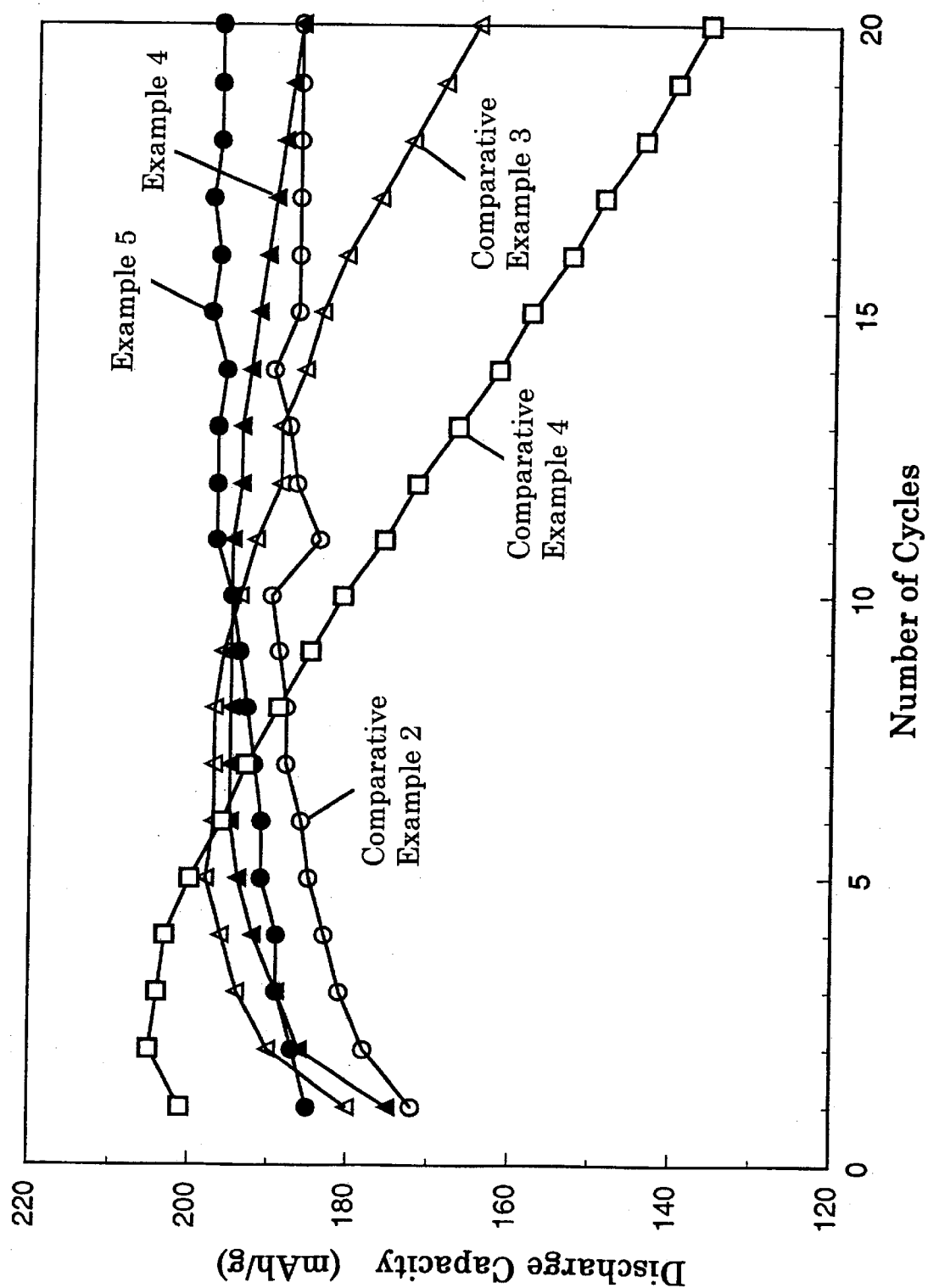
FIG. 2 is a graph showing the variation with cycles of the discharge capacity in Examples 4–5 and Comparative Examples 2–4.

FIG. 2 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Comparative Example 3

The mixture of lithium nitrate, metastannic acid and basic nickel carbonate obtained in Example 3, was charged in a tubular furnace having an alumina core tube and fired in a stream of oxygen (50 cm$^3$/min) at 750° C. for 5 hours.

X-ray diffraction measurement of the resultant powder was conducted, and besides the strong peaks assigned to lithiated nickel dioxide, peaks near $2\theta=22.5°$ and 34.4° were observed. The intensity ratio of the peak near 2θ=22.5° to the peak near 2θ=34.4° was 1.6.

By using thus obtained powder, a plate battery (electrolyte: LiPF6/EC+DMC+EMC) was manufactured and subjected to the charging/discharging test using charge by a constant current and voltage, and discharge by a constant current under the same conditions with Example 1.

FIG. 2 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Example 4

First, Lithium nitrate (manufactured by Wako Pure Chemical Industries, Ltd., guaranteed graded reagent) 12.07 g was dissolved in 16.7 g of water, and then metastannic acid ($H_2SnO_3$: manufactured by Nihon Kagaku Sangyo Co., Ltd., purity 95%) 0.84 g and basic nickel carbonate [$NiCO_3.2Ni(OH)_2.4H_2O$: manufactured by Wako Pure Chemical Industries, Ltd., graded reagent] 21.62 g were added and homogeneously dispersed therein. After evaporating the water content, the resultant mixture was charged in a tubular furnace having an alumina core tube and fired in a stream of oxygen (50 $cm^3$/min) at 750° C. for 5 hours. At this point, the molar ratio x of tin to the sum of tin and nickel was set to be 0.03.

X-ray diffraction measurement of the resultant powder was conducted, and besides the strong peaks assigned to lithiated nickel dioxide, peaks near 2θ=22.5° and 34.4° were observed. The intensity ratio of the peak near 2θ=22.5° to the peak near 2θ=34.4° was 0.4.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions with Example 1.

FIG. 2 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Example 5

First, Lithium nitrate (manufactured by Wako Pure Chemical Industries, Ltd., guaranteed graded reagent) 4.26 g and metastannic acid ($H_2SnO_3$: manufactured by Nihon Kagaku Sangyo Co., Ltd., purity 95%) 5.06 g were mixed well, then the resultant mixture was charged in a tubular furnace having an alumina core tube and fired in a stream of oxygen (50 $cm^3$/min) at 640° C. for 20 hours to produce lithium stannate ($Li_2SnO_3$).

Next, Lithium nitrate (manufactured by Wako Pure Chemical Industries, Ltd., guaranteed graded reagent) 11.82 g was dissolved in 17.1 g of water, and then 0.60 g of lithium stannate obtained above and basic nickel carbonate [$NiCO_3.2Ni(OH)_2.4H_2O$: manufactured by Wako Pure Chemical Industries, Ltd., graded reagent] 21.84 g were added and homogeneously dispersed therein. After evaporating the water content, the resultant mixture was charged in a tubular furnace having an alumina core tube and fired in a stream of oxygen (50 $cm^3$/min) at 660° C. for 15 hours. At this point, the molar ratio x of tin to the sum of tin and nickel was set to be 0.02.

X-ray diffraction measurement of the resultant powder was conducted, and besides the strong peaks assigned to lithiated nickel dioxide, peaks near 2θ=22.5° and 34.4° were observed. The intensity ratio of the peak near 2θ=22.5° to the peak near 2θ=34.4° was 0.3.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions with Example 1.

FIG. 2 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

Comparative Example 4

First, Lithium nitrate (manufactured by Wako Pure Chemical Industries, Ltd., guaranteed graded reagent) 12.07 g was dissolved in 16.7 g of water, and then metastannic acid ($H_2SnO_3$: manufactured by Nihon Kagaku Sangyo Co., Ltd., purity 95%) 0.28 g and basic nickel carbonate [$NiCO_3.2Ni(OH)_2.4H_2O$ : manufactured by Wako Pure Chemical Industries, Ltd., graded reagent] 22.06 g were added and homogeneously dispersed therein. After evaporating the water content, the resultant mixture was charged in a tubular furnace having an alumina core tube and fired in a stream of oxygen (50 $cm^3$/min) at 750° C. for 5 hours. At this point, the molar ratio x of tin to the sum of tin and nickel was set to be 0.01.

X-ray diffraction measurement of the resultant powder was conducted, and the peaks assigned to lithiated nickel dioxide and the unassigned peak near 2θ=22.5° were observed, but the peak near 2θ=34.4° was not observed.

By using thus obtained powder, a plate battery (electrolyte: $LiPF_6$/EC+DMC+EMC) was manufactured and subjected to the charging/discharging test using charge by a constant current and voltage, and discharge by a constant current under the same conditions with Example 1.

FIG. 2 is a graphical representation of the variations of the discharge capacity in 20 cycles of charging/discharging processes. Irreversible capacity and retention rate of capacity R (=discharging capacity at 20th cycle/discharging capacity at 10th cycle) are shown in Table 1.

TABLE 1

| | Tin compound | x | Firing temperature ° C. | Firing time h | Intensity ratio $I_{22.5°}/I_{34.4°}$ | Irreversible capacity mAh/g | Retention rate of capacity % |
|---|---|---|---|---|---|---|---|
| Example 1 | $SnO_2$ | 0.05 | 640 | 30 | 0.1 | 40 | 99.4 |
| Comparative Example 1 | None | 0 | 720 | 5 | No peak at 34.4° | 45 | 84.7 |

TABLE 1-continued

| | Tin compound | x | Firing temperature °C. | Firing time h | Intensity ratio $I_{22.5°}/I_{34.4°}$ | Irreversible capacity mAh/g | Retention rate of capacity % |
|---|---|---|---|---|---|---|---|
| Example 2 | $H_2SnO_3$ | 0.01 | 640 | 20 | 0.8 | 39 | 98.5 |
| Example 3 | $H_2SnO_3$ | 0.02 | 640 | 15 | 0.2 | 32 | 97.9 |
| | | | 640 | 20 | 0.5 | 33 | 97.5 |
| | | | 660 | 15 | 0.8 | 45 | 97.4 |
| Comparative Example 2 | $H_2SnO_3$ | 0.02 | 720 | 5 | 1.3 | 55 | 98.4 |
| Comparative Example 3 | $H_2SnO_3$ | 0.02 | 750 | 5 | 1.6 | 40 | 85.1 |
| Example 4 | $H_2SnO_3$ | 0.03 | 750 | 5 | 0.4 | 44 | 98.4 |
| Example 5 | $Li_2SnO_3$ | 0.02 | 660 | 15 | 0.3 | 47 | 101.0 |
| Comparative Example 4 | $H_2SnO_3$ | 0.01 | 750 | 5 | No peak at 34.4° | 39 | 75.1 |

What is claimed is:

1. A lithium secondary battery comprising:

a cathode including material that can be doped/undoped with lithium ions as an active material;

an anode including a lithium metal, a lithium alloy, or a material that can be doped/undoped with lithium ions as an active material; and a liquid or solid electrolyte, wherein lithiated nickel dioxide containing tin is used as the cathode active material, and said lithiated nickel dioxide is produced by firing a mixture of a lithium compound, a nickel compound and tin or a tin compound at a temperature of from 350° C. to 800° C., has a peak near 2θ=34.4° and does not have a peak at 2θ=22.5° in the X-ray diffraction pattern by CuK α rays, or the intensity ratio of the peak at 2θ=22.5° to a peak assigned to the diffraction line (200) of lithium stannate ($Li_2SnO_3$) is 1.2 or less, wherein the X-ray diffraction pattern is measured under the conditions of:

X-ray: CuK α;
Voltage-Current: 40 kV-30mA;
Range of measured angle: 2θ=15 to 90°;
Slit: DS-1°, RS-0.3 mm, SS-1°;
Step: 0.02°; and
Counting time: 1 second.

2. A lithium secondary battery according to claim 1, wherein lithium stannate is used as the tin compound.

3. A lithium secondary battery according to claim 1, wherein the lithiated nickel dioxide containing tin is obtained by the steps of dispersing a tin compound and a nickel compound in an aqueous solution including a water-soluble lithium salt, evaporating a water content of the resultant solution to obtain a mixture, and firing the resultant mixture in an atmosphere containing oxygen.

4. A lithium secondary battery according to claim 3, wherein lithium nitrate is used as the water-soluble lithium salt, and a basic nickel carbonate is used as the nickel compound.

5. A lithium secondary battery according to claim 1, wherein the firing is conducted at a temperature of lower than 660° C.

6. A cathode active material for use in a lithium secondary battery, wherein said cathode active material is lithiated nickel dioxide containing tin, which has a peak near 2θ=34.4° and does not have a peak at 2θ=22.5° in the X-ray diffraction pattern by CuK α rays, or the intensity ratio of the peak at 2θ=22.5° to a peak assigned to the diffraction line (200) of lithium stannate ($Li_2SnO_3$) is 1.2 or less.

7. A lithium secondary battery according to claim 1, wherein the lithiated nickel dioxide is produced by firing at a temperature of from 600° C. to 750° C.

* * * * *